United States Patent [19]

Weber

[11] Patent Number: 4,458,204
[45] Date of Patent: Jul. 3, 1984

[54] FREQUENCY DEPENDENT PULSED GAIN MODULATED CONCEALED STRUCTURE LOCATOR

[76] Inventor: Harold J. Weber, P.O. Box 214, 20 Whitney Dr., Sherborn, Mass. 01770

[21] Appl. No.: 300,696

[22] Filed: Sep. 10, 1981

[51] Int. Cl.$^3$ .................. G01V 3/11; G01V 3/165
[52] U.S. Cl. .................................................. 324/326
[58] Field of Search .......................... 324/326–329, 324/67

[56] References Cited

U.S. PATENT DOCUMENTS

| | | | |
|---|---|---|---|
| 4,044,299 | 8/1977 | Weber | 324/326 |
| 4,095,167 | 6/1978 | Weber | 324/326 |
| 4,112,349 | 9/1978 | Weber | 324/326 |
| 4,137,500 | 1/1979 | Weber | 375/17 |
| 4,147,973 | 4/1979 | Weber | 324/329 X |
| 4,161,686 | 7/1979 | Weber | 324/326 |
| 4,196,391 | 4/1980 | Weber | 324/328 |
| 4,255,710 | 3/1981 | Weber | 324/328 |
| 4,263,552 | 4/1981 | Weber | 324/326 |
| 4,295,095 | 10/1981 | Thomas et al. | 324/326 |
| 4,387,340 | 6/1983 | Peterman | 324/326 |

*Primary Examiner*—Gerard R. Strecker

[57] ABSTRACT

Portable concealed structure locating and surveying translator apparatus, useful for tracing the bearing and lay of cables, pipes, and other expansive structures. The translator responds to the electromagnetic field radiating from a buried structure which is excited by a constant amplitude, fixed frequency high frequency a.c. signal. The translator is directional, providing bearing indication in its preferred form. Two noncoincident receiving loops, or inducers, are closely oriented to receive the structure radiated field lines with differing positional related efficacity. The received signal levels produced in each of the receiving loops is coupled with a receiver which includes a provision for the automatic, digitally advanced, sequential step-by-step change in overall sensitivity through a range of discrete values of responsiveness. Each discrete response value recurs at a related, finite repetition rate which results in an overall characteristic stepped swept gain effect, thereby producing instantaneous variegated values of signal level which are detected as finite threshold levels and thereby usually adapted into a pair of audio frequency tones which, when coupled to an operator's ears, serve to give a stereotonic effect with the balance of apparent pitch therebetween indicating on-course bearing, while the relative pitch imbalance wrought between the right and the left ear associated earphone gives a sense of bearing directionality to the operator.

16 Claims, 7 Drawing Figures

SIGNAL LEVEL RESPONSE SENSITIVITY

FREQUENCY DEPENDENT PULSED GAIN MODULATED CONCEALED STRUCTURE LOCATOR

SUMMARY OF THE INVENTION

My invention teaches a stereotonic, bearing indicative directional concealed structure locator, and most particularly a translator apparatus therefor which responds to the field lines emanating from a buried structure which is energized by a separate exciter apparatus, such as taught in my U.S. Pat. No. 4,095,167. In another earlier U.S. Pat. No. 4,147,973 I show a translator which is level responsive to a special variegated amplitude pulse modulated exciter, taught in my U.S. Pat. No. 4,137,500. This earlier translator and special exciter is effectual, and a dual channel receiving apparatus as taught in the mentioned U.S. Pat. No. 4,147,973 patent may be adapted as a useful expedient, as further shown in my U.S. Pat. No. 4,263,552, to provide a stereotonic cable and pipe tracer. This earlier apparatus combination is limited, however, to the use of the earlier special pulse amplitude modulated exciter machine.

It is therefore an object of the instant invention to provide a translator which provides the variegated pulse amplitude threshold demodulation advantages which provides for the direct deriviation of the output pulse rate from the instantaneous received signal amplitude, whilst responding to a substantially constant amplitude, fixed frequency electromagnetic field signal emanating from the concealed structure. The structure may, therefore, be excited by a less complex and costly, ordinary continuous wave exciter. The signal processing necessary to adapt the received signal into the resolvable pulse amplitude signal necessitous to accomplish the inventions essence is incorporated into the translator and is believed to add substantially less cost thereunto than when the same effective capability is added to the exciter apparatus.

Another object of the invention is to provide a translator which is stereotonic, providing a directional indication, as well as relative position, for the lay of a buried pipe, cable, etc.

A further object of the invention is to provide the essence of a measurement system, adapted for pipe and cable locating, which responds to the received signal amplitude of a separate source of high frequency a.c. energy, converting the changes in the average amplitude level of such received signal directly into a train of pulses having a varietal range of repetition rates in finite predetermined steps, whereby the instantaneous effective repetition rate is proportional to the received signal amplitude.

Still another object is to provide a gain controlled receiver apparatus which is gain modulated in accord with a train of varietal amplitude, cyclically repetitive control pulses which act in combination with the average level of a received a.c. signal to produce a composite pulse amplitude variegated received a.c. signal at the input of a threshold detector, the combination resulting in pulses of detected a.c. signal which recur at regular periodicities predetermined by the a.c. signal level.

While yet another object is to teach a translator adapted as a pipe and cable locator which is portable, battery operated, and thereby useful as a surveying tool.

These and other objects of my instant invention shall become apparent from the further teaching of the ensuing description.

DESCRIPTION OF PREFERRED EMBODIMENT

Figure 1:
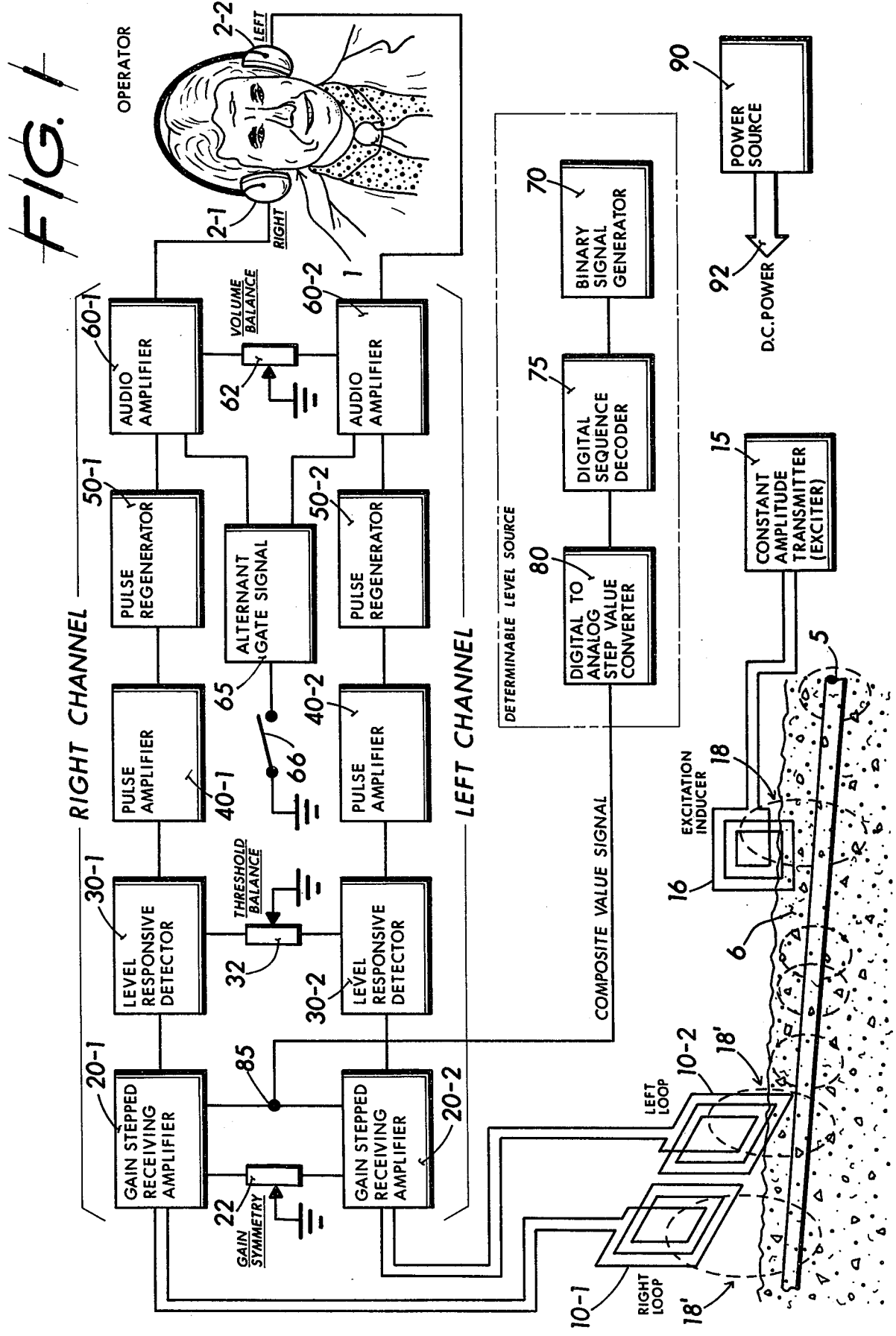
FIG. 1 Essential diagram depicting an exciter coupled with a buried cable or pipe, with directional loop antennae responding thereto, producing signals which are processed through "right" and "left" receiving channels which, when combined with a composite value signal, produce earphone indications to an operator as to the buriment location and bearing.

The essence of my translator appears in FIG. 1, showing a stereotonic, two channel apparatus that gives a sense of bearing, as well as relative nearness of a metallic object's position. This bearing indication is provided for the operator 1 through the difference in pitch between the audio tones produced in the earphones 2-1, 2-2.

A constant amplitude exciter 15, such as may be adapted from my U.S. Pat. No. 4,095,167 including the inducer 16, couples high frequency a.c. (e.g., radio frequency) energy into the concealed structure through the radiated electromagnetic field lines 18. The structure may be a pipe 5, or cable, situated in soil 6. The parasitic reradiation of the energy induced into the pipe produces numerous field lines 18' which emanate and variously couple with the portable inducers 10-1, 10-2, with the instant signal appearing across the terminals of either inducer being proportional to the relative position of the inducer respective with the pipe lay. This changeable signal difference yields the electrical sense of bearing. Each inducer couples with a gain stepped receiving amplifier 20-1, 20-2 which includes a "gain symmetry" control 22 for equalizing the net gain through each amplifier. Each amplifier also includes a gain control input 85 which effects what is usually an about equal voltage controlled gain variation in each amplifier. This gain control input couples with a composite multiple value stepped amplitude signal, produced by the combination of a binary signal generator 70, digital sequence decoder 75, and digital-to-analog step value converter 80 that produces a variegated amplitude, stepped control signal wherein each finite amplitude step recurs at a regular cyclic rate which is harmonically related to the different rate of every companion step of other amplitude.

Each amplitude step usually provides an active duration which is somewhat less than the full cycle period of the highest recurrent rate amplitude step and furthermore each singular rate recurrent amplitude signal is usually at an absolute amplitude which is greatest for the less frequently recurring amplitude steps and least amplitude for the most frequently recurring amplitude steps. Means for generating this type of unique, stepped amplitude waveform is described detailedly in my U.S. Pat. No. 4,137,500.

In either the "right" or "left" receiving channel, each receiving amplifier output comprises a high frequency a.c. signal which is variously stepped in average, albeit instantaneous, amplitude by the composite value signal effect on the amplifier gain, with the absolute instantaneous level being proportional to the combination of the inducer provided signal level and the amplifier's gain. A level responsive detector 30-1, 30-2 is set by a "threshold balance" control 32 to respond with a first binary level therefrom for an a.c. signal amplitude greater than the determinable threshold, and a second binary value for an a.c. signal amplitude which is lesser. This binary value signal, which due to intrinsic detector nonlinearities may vary somewhat in absolute amplitude, is coupled with a pulse amplifier 40-1, 40-2 which provides some pulse conditioning. A pulse regenerator 50-1, 50-2 may be further provided, which is usually a monostable oscillator serving to normalize the active pulse width to a uniform duration somewhat less than the highest expected incoming stepped amplitude signal repetition rate period. The audio amplifiers 60-1, 60-2 serve to couple the audio rate pulsing signal to the operator's earphones 2-1, 2-2 for indication. The alternant gate signal source 65 provides a subaudible alternating control signal to the audio amplifiers to produce alternant tone reception in the earphones. This back-and-forth switching produces a subtle, very sensitive tone comparison for the operator thereby enhancing his ability to clearly differentiate very small tone pitch differences. A switch 66 allows the operator to selectively enable this feature. A battery or other power source 90 provides d.c. power 92 as necessary to operate the several electrical circuit functions comprising the translator.

Figure 2:
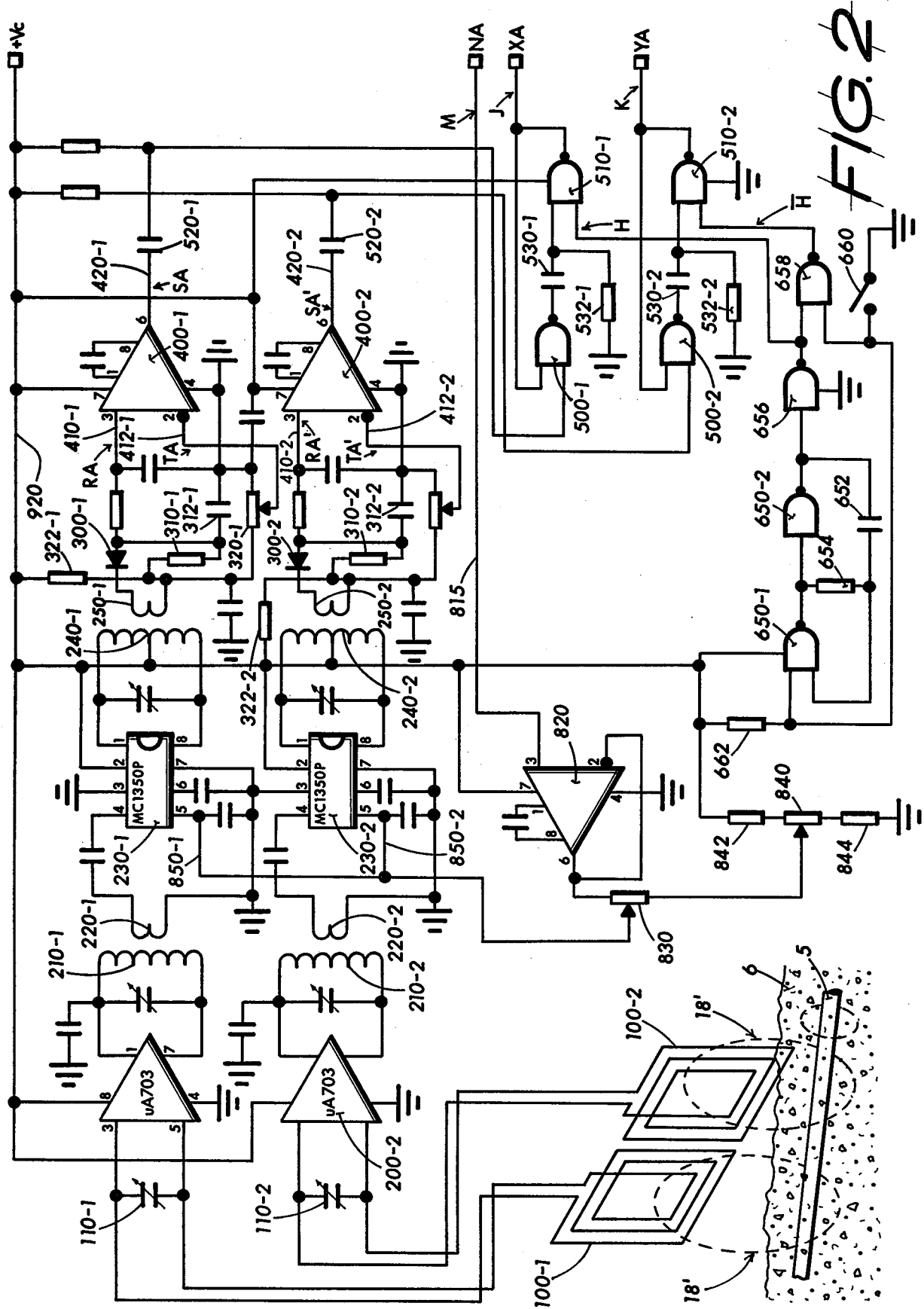
FIG. 2 Circuit diagram for the receiving portions of a preferred embodiment.

The preferred embodiment for one form of my teaching appears in FIG. 2. Two closely spaced resonant inducer loops 100-1, 100-2 tuned by capacitors 110-1, 110-2 are effective to respond from a different spatial orientation with the electromagnetic field lines emanating from the buried structure. This different response, serving as bearing indicative error signals, is separately amplified, as typified by the amplifier 200-2, and therefrom coupled through selective tuned inductor 210-1, 210-2 by the secondary winding 220-1, 220-2 with the amplifier element 230-1, 230-2 that may be a MC-1350P integrated circuit made by Motorola Semiconductor Products Inc. The suggested amplifier affords a ready gain controllable input 850-1, 850-2 which couples through the dynamic modulation range setting potentiometer 830 to the output of a buffer amplifier 820 which receives a composite control signal on line 815 at input NA. The voltage divider consisting of resistors 842, 844 and potentiometer 840 provides a pedestal d.c. gain control input level for the amplifiers 230-1, 230-2 which serves to set at least their best operating point. The amplifier outputs couple through selective tuned inductors 240-1, 240-2 by the secondary winding 250-1, 250-2 with the detector diode 300-1, 300-2 and the threshold biasing network including at least resistors 322-1, 322-2 together with detector load resistor 310-1, 310-2 and detector capacitor 312-1, 312-2. The voltage appearing at the tap provided on the variable resistor, typified by potentiometer 320-1, couples to the INVERTING input 412-1, 412-2 of an operational amplifier comparator 400-1, 400-2 for setting the threshold thereof. The NONINVERTING input 410-1, 410-2 accepts detected negative d.c. level from the detector as developed across the diode load resistor and capacitor. When the NEGATIVE level on the input of the comparator exceeds the POSITIVE d.c. threshold established on the other input, a NEGATIVE pulse occurs at the output 420-1, 420-2 which couples through differentiating capacitor 520-1, 520-2 such that the negative going leading edge of the pulse triggers a one-shot multivibrator comprising the gates 500-1, 510-1 (500-2, 510-2) including the timing components 530-1, 532-1 (530-2, 532-2) producing signals on the output lines XA, YA. A free-running multivibrator, having about a one hertz rate, including gates 650-1, 650-2 and timing components 652, 654 couples with inverter 656 and control gate 658 to alternately switch the XA and YA outputs "on" and "off" for about one-half second each. Switch 660, together with pullup resistor 662 controls the gating action, being ON when the switch 660 is OPEN.

Figure 3:
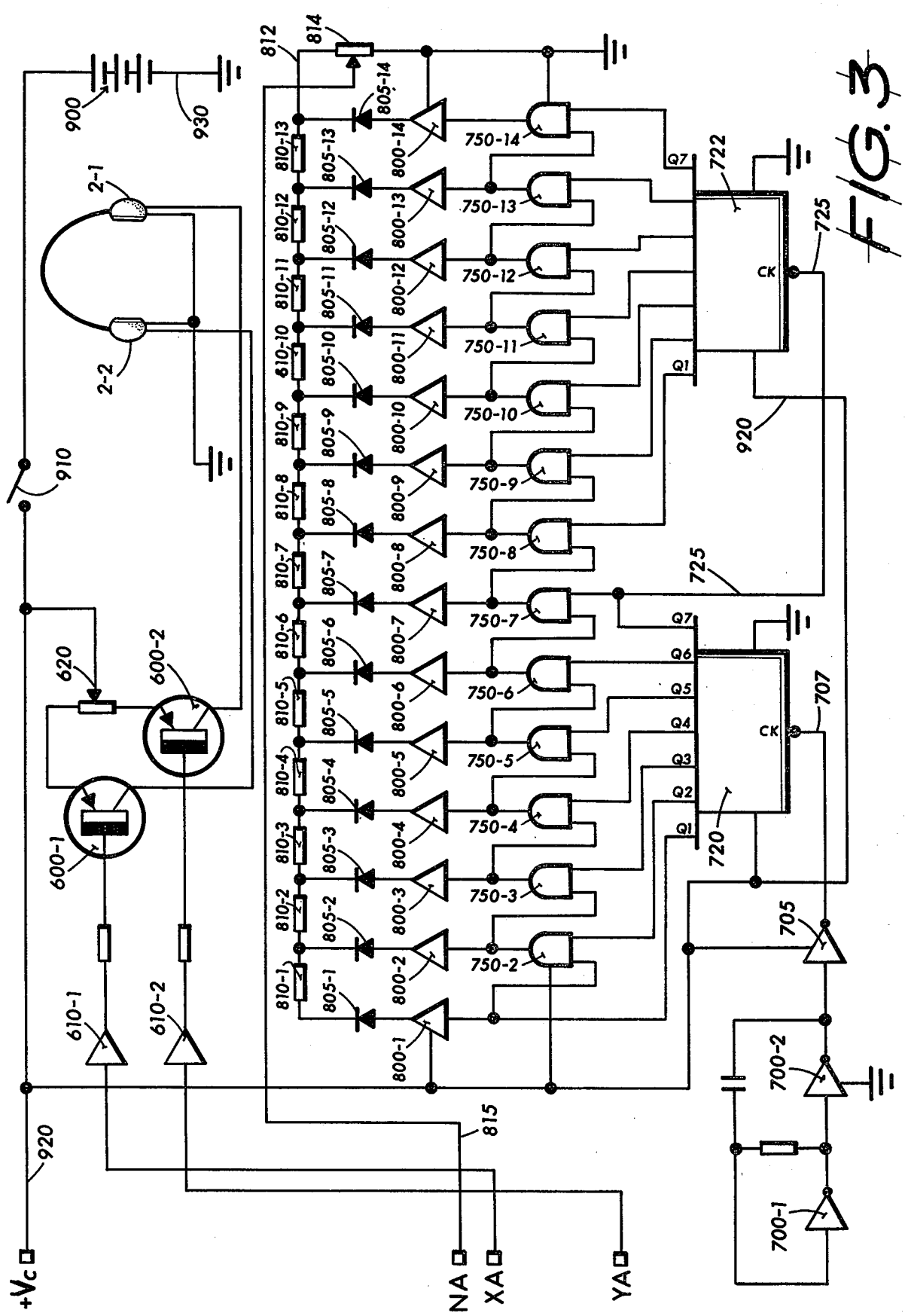
FIG. 3 Circuit diagram for the composite value signal source and earphone amplifiers which couples with the receiving portions of FIG. 2.

FIG. 3 shows my preferred embodiment for one form of a multiple value stepped amplitude signal producing source providing fourteen distinct levels. The circuit includes a clock signal source having inverters 700-1, 700-2 hooked up as a multivibrator producing a recurrence rate exampledly around fourteen kilohertz in my tried model. This signal serves to drive the clock input 707 of the cascade arrangement of the two seven bit binary period decoder counters 720, 722 to provide fourteen binary outputs on the Q1-Q7 output lines of each counter, with the Q1 output of counter 720 being one half the clock signal frequency, descending to the Q7 output of counter 722 which is 1/16,384-th of the clock frequency, in my model being about 0.8545 hertz. This results in a subsequent range of pulse trains, or audio tones, from 7,000 hertz down to 0.8545 hertz, with the latter being reproduced later in the operator's earphone more as a "tick" rather than as a "tone". The following chart lists the periodicites of the various pulse train signals produced by the described apparatus:

| OUTPUT | RATE | DERIVATIVE |
|--------|------|------------|
| 720-Q1 | 7,000 Hz. | Fc/2 |
| 720-Q2 | 3,500 Hz. | Fc/4 |
| 720-Q3 | 1,750 Hz. | Fc/8 |
| 720-Q4 | 875 Hz. | Fc/16 |
| 720-Q5 | 437.5 Hz. | Fc/32 |
| 720-Q6 | 218.75 Hz. | Fc/64 |
| 720-Q7 | 109.375 Hz. | Fc/128 |
| 722-Q1 | 54.687 Hz. | Fc/256 |
| 722-Q2 | 27.344 Hz. | Fc/512 |
| 722-Q3 | 13.672 Hz. | Fc/1024 |
| 722-Q4 | 6.836 Hz. | Fc/2048 |
| 722-Q5 | 3.418 Hz. | Fc/4096 |
| 722-Q6 | 1.709 Hz. | Fc/8192 |
| 722-Q7 | 0.855 Hz. | Fc/16384 |

This listing further serves to clearly show the harmonic relationship between the derived tones and the clock frequency Fc.

The Q1 through Q7 outputs of each counter 720, 722 are combined in the AND gates 750-2 through 750-14, the resulting control signal outputs of which drive buffers 800-2 through 800-14, whilst buffer 800-1 is driven directly by the Q1 output of the counter 720. The buffers couple with steering diodes 805-1 through 805-14, and summing resistors 810-1 through 810-13 producing a composite multilevel amplitude stepped signal at juncture 812, thereby providing 8,192 unique pulse level pattern combinations before the cycle repeats. The tap on potentiometer 814 is set to deliver a portion of this developed signal pattern on line 815 through the shown connection NA which couples with a like connection in FIG. 2. This overall arrangement provides a modulated gain control of the amplifiers 230-1 (230-2) in FIG. 2 which follows the unique signal format developed by the circuit of FIG. 3.

The pulse signals, e.g. "audio tones", developed by the FIG. 2 circuit couple in through terminals XA and YA to buffers 610-1 (610-2) and PNP transistors 600-1 (600-2) such as type 2N2907 which provide the pulse current gain to drive the earphones 2-1, 2-2. Potentiometer 620 serves as a "volume balance" control by differentially varying the emitter degeneration in either of the PNP transistors.

D. c. power is supplied by a battery 900, typically eight size "AA" dry cells coupled to chassis ground 930 and through power switch 910 to the $+V_c$ d.c. power bus 920.

Figure 4:
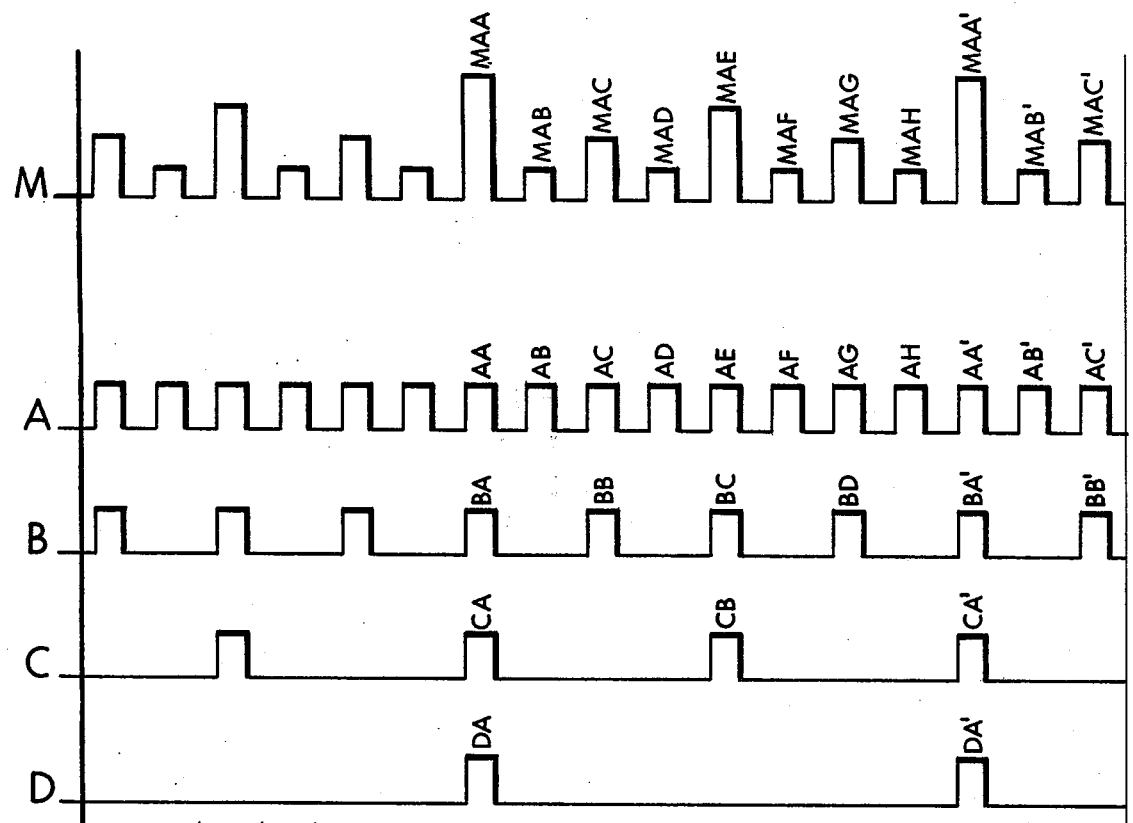
FIG. 4 Pulse waveforms showing various timing and amplitude relationships.

The waveform drawing FIG. 4 depicts the portion of the multilevel pulse signal appearing on the NA line M in FIG. 3 as coupled to FIG. 2. This portion comprises on the first four counter 720 outputs Q1 through Q4 as processed by the AND gates and yielding the A, B, C, D signals shown for FIG. 3. What is clear is the amplitude relationships. The MAA pulse, which is of maximum amplitude, is produced when the least frequent DA pulse occurs, whereas the amplitude is proportionately lesser for the more frequent A, B, and C pulses.

Figure 5:
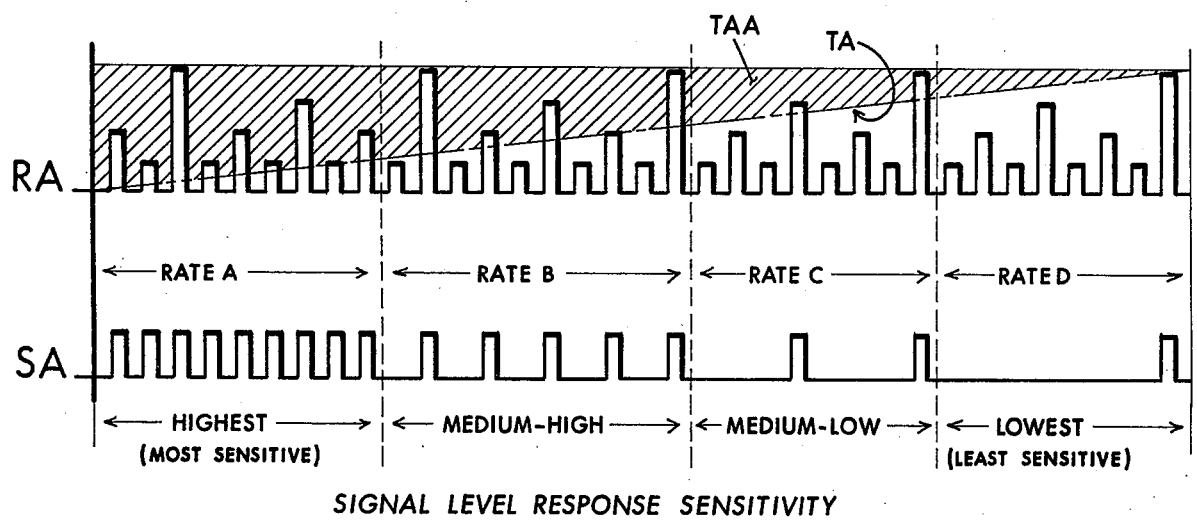
FIG. 5 Pulse waveform showing threshold detector level response thereto.

The FIG. 5 waveform depicts how the comparator threshold signal TA is related to the incoming detected signal RA so that whenever an incoming RA signal exceeds the threshold TA into the shaded region TAA, an output pulse SA is produced from the comparator. As the threshold level increases, the effective output pulse RATE changes from A through D, from the highest rate to the lowest rate. This is a factor of four change for the pulse example reflected from FIG. 4.

Figure 6:
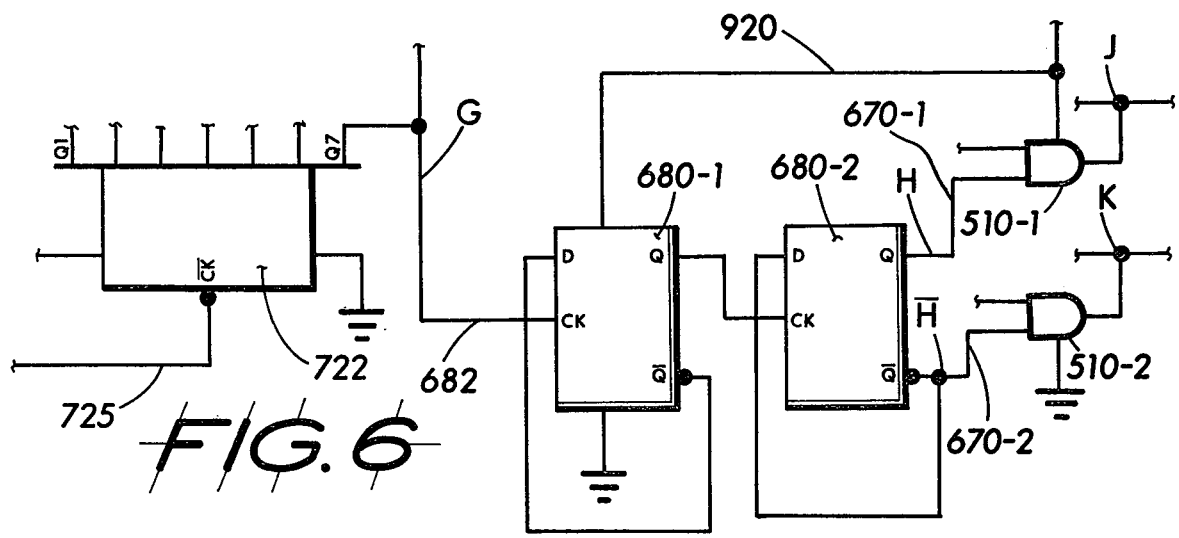
FIG. 6 Circuit for providing alternant gate signal from composite signal source.
Figure 7:
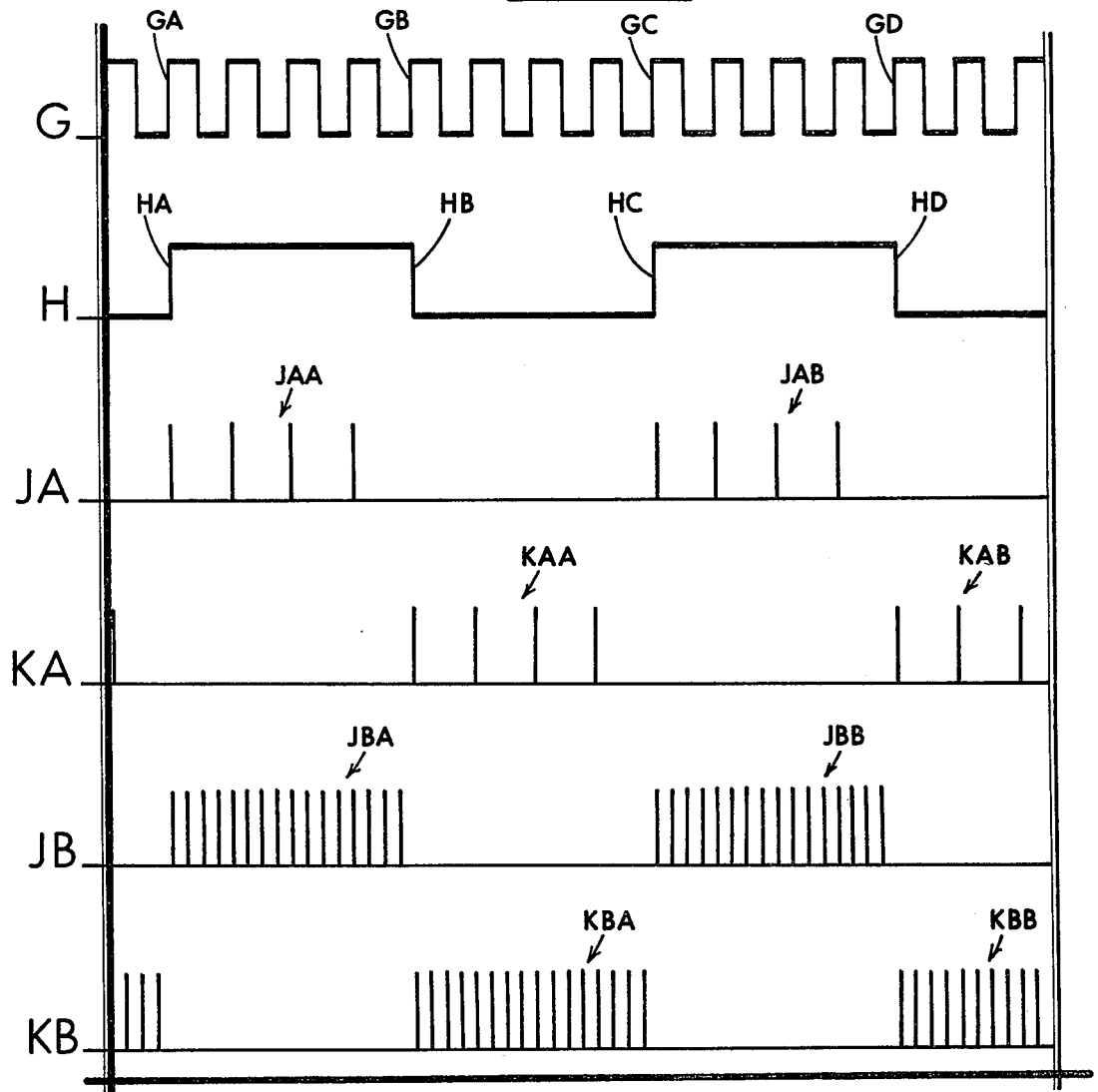
FIG. 7 Waveform representation showing effect of alternant gate signal in combination with the recovered earphone pulse signal.

The alternant gate signal is derived from the clock signal in FIG. 6. The "D" flipflops 680-1, 680-2 offer a divide-by-four function hooked to Q7 output of counter 722 in FIG. 3. This provides a triggering signal 682 which is divided to provide two alternant low periodicity rate signals coupled by lines 670-1' (670-2') to the AND gate 510-1 (510-2) inputs. The effective action is shown in FIG. 7 where the 0.8545 hertz G signal is further divided to provide the H signals which transition HA,HB,HC,HD on the leading edge GA,GB,GC,GD of every fourth G pulse. The result is the J tone pulse outputs from gate 510-1 and the K tone outputs from gate 510-2 produces alternant tone bursts JA, JB, and KA, KB where that part JAA, JAB, JBA, JBB coincides with one half of the H cycle, whilst the other part KAA, KAB, KBA, KBB coincides with the second half of the H cycle.

The elements comprising my translator when properly coupled to each other as shown in FIGS. 2 and 3 form a compact arrangement which can principally be contained upon a printed circuit board or like support means within a protective housing. My model which operates successfully utilizes the following key components:

| | |
|---|---|
| integrated circuit 200-1, 200-2 | Fairchild type uA-703 |
| integrated circuit 230-1, 230-2 | Motorola type MC-1350P |
| integrated circuit 400-1, 400-2, 820 | R.C.A. type CA-3130 |

-continued

| | |
|---|---|
| integrated circuit 500-1, 500-2, 510-1, 510-2, 650-1, 650-2, 652, 654 | C-MOS type ¼ CD4011BE |
| integrated circuit 750-2 through 750-14 | C-MOS type ¼ CD4081BE |
| integrated circuit 720, 722 | C-MOS type CD4024AE |
| integrated circuit 800-1 through 800-14 | C-MOS type 1/6 CD4050AE |
| integrated circuit 700-1, 700-2, 705 | C-MOS type 1/6 CD4069BE |
| integrated circuit 680-1, 680-2 | C-MOS type ½ CD-4013AE |
| diodes 300-1, 300-2 | 1N270 |
| diodes 805-1 through 805-14 | 1N914 |
| tuned transformers 210-1, 210-2, 240-1, 240-2 | 385 kilohertz |

While my invention teaches the use of particular frequencies for operation of the individual circuit elements, other combinations of appropriately related frequencies may offer equivalent performance.

While my invention has been shown to use particular types of integrated circuit gain and function devices, a person skilled in the art can duplicate the same functions from builtup circuits consisting of individual components arranged in a wide variety of combinations, or with other combinations of integrated circuits.

I have hiterto described my invention in terms of a particular form and usage because that form presents most clearly a particular well understood difficulty my invention improves upon, but it will be understood that my invention is also applicable to other manner of construction and useful application. Therefore my stated parameters and values are given by way of mere example to assist one of average skill in the art to duplicate my invention, and are not intended to limit in any way the scope of my invention's utility.

What I claim is:

1. Translator apparatus adapted to provide a pulse train therefrom having a pulse repetition rate frequency which is derived from the average, albeit varying, amplitude of a higher frequency a.c. signal coupled thereto; comprising:

a. a portable source of about constant level, essentially continuous wave first frequency a.c. signal;

b. portable receptor means effective to separably couple with said source, usually with various levels of efficaciousness therebetween, producing therefrom a received a.c. signal proportional to the first frequency a.c. signal level modified by the coupling effacicity;

c. digital sequence signal source means effective for producing several series of pulse train signals having different intrinsic periodicity rates therebetween while having harmonic relationship thereamongst;

d. digital-to-analog stepped signal converter means coupled with said sequence signal source, effective to receive pulse train signals therefrom and produce a composite signal comprising a repetitious continuum of various amplitude value steps, each constituent step of which has a predetermined amplitude value proportional to the signal pulse series comprising the lowest frequency pulse train instantly produced by said sequence signal source;

e. receiver means coupled with said receptor means provided with an effective signal level control input thereto coupled with said composite signal, and a converted output therefrom; operative to combine, as by modulation, said received a.c. signal with said composite signal so as to produce a repetitive sequence comprising bursts of converted received signals having various values of predetermined amplitude; and further including threshold detector means responsive to the instant values of said converted received a.c. signals to repetitively produce at least a first level pulse signal therefrom when said converted received signal exceeds a predetermined threshold value, and a second level pulse signal therefrom when said converted received signal shortfalls the predetermined threshold value;

f. indicant means coupled to said pulse signal produced by said threshold detector means; and, g. electric power source means effective to provide operating voltage and current to each of the thereto coupled functional elements comprising the said translator.

2. Translator of claim 1 wherein said receiver means comprises:

a. high frequency a.c. amplifier means having a signal input thereto coupled with said receptor means, an amplified a.c. signal output, and a control input thereto which effects variation of gain through the amplifier means; and, b. threshold detector means coupled with said a.c. signal output and effective to instantaneously convert the amplified a.c. signal coupled from the said a.c. amplifier into a substantially unipolar first level pulse signal when the a.c. signal is above the predetermined threshold value and alternatively a second level pulse signal when the a.c. signal is below the predetermined threshold value.

3. Translator of claim 1 wherein further a pulse amplifier means is coupled between said threshold detector means and said indicant means being therewith effective to increase the efficaciousness of at least one parameter of pulse amplitude, pulse shape, and active pulse duration of the therebetween coupled pulse signal.

4. Translator of claim 2 wherein further a pulse regenerator means is coupled between said threshold detector means and said indicant means being therewith effective to normalize the efficaciousness of the therebetween coupled pulse signal amplitude and active pulse duration.

5. Translator of claim 2 wherein the predetermined threshold value average effect is settable as an operator control, thereby providing a change in overall translator sensitivity.

6. Translator of claim 1 wherein said digital sequence signal source means comprises:

a. clock signal source having a periodic rate that is a predetermined even multiple of the highest periodicity rate pulse train signal;

b. binary divider means having a clock input thereto coupled with said clock signal source, effective to produce a different integral periodicity pulse train signal at each of several outputs;

c. digital sequence decoder means coupled with the binary divider several outputs and effective to combine the therefrom obtained binary signal trains into several ordered pattern pulse trains each having an active period less than the full cycle period of the highest periodicity said binary signal train, and each provided at one of a plurality of outputs therefrom; and, wherein further said ditital-to-analog stepped signal converter means comprises:

d. value summing means coupled to said decoder outputs and operative to produce a composite pulse train signal comprising a sequence of substantially equal period pulses having different instantaneous voltage amplitudes, each amplitude corresponding, respectively, to a combination of usually several different ordered pattern pulse trains and recurring at the rate determined by the dominant combination of corresponding ordered pattern pulse train rates.

7. Translator of claim 1 wherein said periodic rate of each component of said pulse train signal produced by the digital sequence source means recurs at audible and subaudible rates between about 2 hertz and 20 kilohertz.

8. Translator of claim 7 wherein said indicant means includes audio amplifier means to increase at least the effective amplitude of the pulse signal produced by said threshold detector means.

9. Translator of claim 8 wherein said indicant means comprises audio transducer means.

10. Translator of claim 1 wherein said receptor means comprises inducer loop means responsive to proximate electromagnetic a.c. signal fields effectively produced by said source.

11. Translator of claim 10 wherein said fields emanate from a substantially stationary conductive structure portably excited by said source, whilst said inducer means is separably portable relative thereto.

12. Translator of claim 10 wherein further at least two separate acting receiving channels comprising responsively separate inducer loop means, receiver means, and indicant means are provided, being variously responsive to the coupling efficacity obtained with a generally singular source of electromagnetic a.c. signal field; together with an effectively common digital sequence source means, digital-to-analog stepped signal source means, and power means; wherein said inducer loop means are each displaced therebetween whilst having substantially common electromagnetic coupling relative with said a.c. signal fields whereby the signals produced by each inducer means are combined to produce an indicated sense of relative bearing between the inducer loop arrangement and the separably positioned said singular source of electromagnetic a.c. signal field.

13. Translator of claim 12 wherein further, an enhancement gate signal source produces two effective gating signals, the individual efficacious periods of which are alternant at low, subaudible frequency usually on the order of 0.5 to 2 hertz; whereby the enhancement gate signal couples to each plural said receiver means to produce an enhancement of the outputted response pulse train signals produced therefrom.

14. Translator of claim 12 wherein further "gain symmetry" control means is provided which couples with each receiver means to balance the ratio of effective gain obtained therebetween.

15. Translator of claim 12 wherein further "threshold balance" control means is provided which couples with each receiver means to balance the said predetermined threshold values therebetween.

16. Translator of claim 12 wherein the pulse signals produced by the receiver means output are essentially audio frequency signals and the therewith coupled said indicant means are effectively separate ear responsive audio transducers, and "volume balance" control means is provided to therebetween balance the loudness of the audible signal, usually as a compensation for an operator's individual ear sensitivities to the response signal audio tones.

* * * * *